United States Patent
Chaudhry et al.

(10) Patent No.: US 10,604,421 B2
(45) Date of Patent: Mar. 31, 2020

(54) WATER TREATMENT WITH NOTIFICATION

(71) Applicant: Rheem Manufacturing Company, Atlanta, GA (US)

(72) Inventors: Raheel A. Chaudhry, Montgomery, AL (US); David I. Vega Fernandez, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 235 days.

(21) Appl. No.: 15/641,036

(22) Filed: Jul. 3, 2017

(65) Prior Publication Data

US 2019/0002303 A1 Jan. 3, 2019

(51) Int. Cl.
- *C02F 1/00* (2006.01)
- *C02F 1/68* (2006.01)
- *C02F 5/00* (2006.01)
- *C02F 101/10* (2006.01)

(52) U.S. Cl.
CPC .............. *C02F 1/008* (2013.01); *C02F 1/685* (2013.01); *C02F 5/00* (2013.01); *C02F 2101/10* (2013.01); *C02F 2209/003* (2013.01); *C02F 2209/445* (2013.01)

(58) Field of Classification Search
None
See application file for complete search history.

(56) References Cited

U.S. PATENT DOCUMENTS

| | | | | |
|---|---|---|---|---|
| 3,901,262 A * | 8/1975 | Gutkowski | .......... | B01D 35/306 137/101.11 |
| 4,548,227 A * | 10/1985 | Regunathan | .......... | B01F 1/0027 137/268 |
| 4,665,808 A * | 5/1987 | Pulvermuller | .......... | A47J 31/40 222/66 |
| 5,885,446 A * | 3/1999 | McGrew, Jr. | ......... | B01F 1/0027 210/198.1 |
| 5,993,753 A * | 11/1999 | Davidson | ............. | B01F 1/0033 210/205 |
| 6,183,631 B1 * | 2/2001 | Cormier | ................ | B01F 1/0027 137/268 |
| 6,281,802 B1 * | 8/2001 | Venable | .................. | C02F 1/688 210/85 |
| 6,287,458 B1 * | 9/2001 | Lawrence | ............. | B01F 1/0027 116/283 |
| 6,287,466 B1 * | 9/2001 | Yassin | ...................... | C02F 1/688 137/268 |
| 6,416,662 B1 * | 7/2002 | Schmidt | .................... | B01F 1/00 210/198.1 |
| 2008/0011076 A1 * | 1/2008 | Buck | ..................... | F16K 15/025 73/198 |
| 2008/0262109 A1 * | 10/2008 | Orlich | .................. | B01F 3/1207 514/789 |
| 2009/0251316 A1 * | 10/2009 | Mamourian | ... | G01R 31/318547 340/540 |
| 2010/0267169 A1 * | 10/2010 | Hajimiri | ............ | G01N 27/3278 436/518 |

* cited by examiner

*Primary Examiner* — Bradley R Spies
(74) *Attorney, Agent, or Firm* — Troutman Sanders LLP

(57) ABSTRACT

A water treatment device includes a water treatment material contained within a housing of the water treatment device. The incoming water is exposed to the water treatment material to produce treated water. A magnetic field-based or a light-based sensor may determine an amount of the water treatment material remaining in the water treatment device and provide notification.

9 Claims, 10 Drawing Sheets

WATER TREATMENT WITH NOTIFICATION

TECHNICAL FIELD

The present disclosure relates generally to water treatment solutions, and more particularly to providing notification of an amount of water treatment material that is used in water treatment.

BACKGROUND

Water treatment devices are typically used for the treatment of water that may have a lower quality than desirable. For example, water that is provided to residences and/or businesses in some areas may contain undesirable minerals or may contain minerals in concentrations that exceed expected or safe amounts. In some cases, water treatment devices may be used to treat incoming water, such as water from a municipality water supply or well water, such that the treated water contains less of some minerals and/or other contents.

Water treatment devices typically use one or more water treatment materials for the treatment of water. The water treatment material used in some water treatment devices may be depleted over time. The water treatment device itself can be used for a long time by replacing the water treatment material when the water treatment material becomes depleted. However, determining whether the water treatment material has been depleted to an amount that requires a replacement is often challenging for consumers. General guidelines for replacing the water treatment material may be unreliable for some consumers. Thus, a solution that enables reliable detection of depletion of a water treatment material of a water treatment device and that provides a notification to consumers is desirable.

SUMMARY

The present disclosure relates generally to water treatment solutions, and more particularly to providing notification of an amount of water treatment material that is used in water treatment. In an example embodiment, a water treatment device includes a water treatment material contained within a housing of the water treatment device, where incoming water is exposed to the water treatment material to produce treated water. The water treatment device further includes a magnetic object having a magnetic field, where the magnetic object rests on the water treatment material. The water treatment device also includes a magnetic sensor circuit that senses the magnetic field of the magnetic object. The magnetic object moves closer to the magnetic sensor circuit as the water treatment material becomes depleted. The magnetic sensor circuit provides a notification when the water treatment material is depleted to a threshold amount.

In another example embodiment, a water treatment device includes a top cover having a water inlet and a water outlet. The water treatment device further includes a housing, where incoming water enters the housing through the water inlet. The water treatment device also includes a container inside the housing, where water treatment material is contained within the container and where treated water exits the container through the water outlet. The water treatment device further includes a magnetic object having a magnetic field, where the magnetic object rests on the water treatment material, and a magnetic sensor circuit that senses the magnetic field of the magnetic object. The magnetic object moves closer to the magnetic sensor circuit as the water treatment material becomes depleted, and the magnetic sensor circuit provides a notification when the water treatment material is depleted to a threshold amount.

In another example embodiment, a water treatment device includes a water treatment material contained within a housing of the water treatment device, where incoming water is exposed to the water treatment material to produce treated water. The water treatment device further includes a light source that emits a light, and a sensor, where the water treatment material blocks the light from reaching the light sensor until the water treatment material is depleted to a threshold amount. In response to receiving the light, the light sensor provides a notification indicating the water treatment material is depleted to the threshold amount.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

Figure 1:
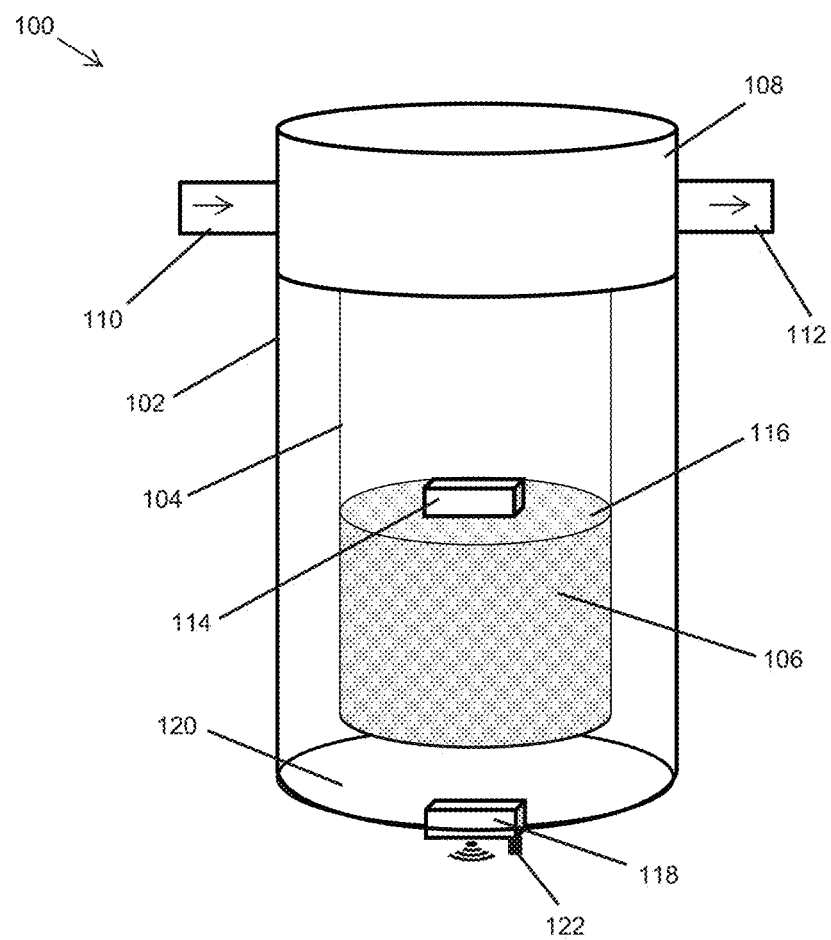
FIG. 1 illustrates a water treatment device with magnet-based detection of water treatment material depletion according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a water treatment device 100 with magnet-based detection of water treatment material depletion according to an example embodiment. In some example embodiments, the water treatment device 100 may be a water neutralizer, a water softener, or a similar water treatment device. As illustrated in FIG. 1, the water treatment device 100 may include a housing 102 and an inner container 104 that is located inside the housing 102. The inner container 104 may contain a water treatment material 106 that is used for treating incoming water. For example, the water treatment material 106 may be a water softener salt. A magnetic object 114 is positioned on a top surface 116 of the water treatment material 106, and a magnetic sensor circuit 118 is positioned outside of the housing 102, below a bottom wall 120 of the housing 102. For example, the magnetic sensor circuit 118 may be attached to the bottom wall 120 of the housing 102 by an adhesive or other means as may be contemplated by those of ordinary skill in the art with the benefit of this disclosure.

In some example embodiments, the water treatment device 100 may also include a cover 108. The cover 108 may include a water inlet 110 and a water outlet 112. The water inlet 110 may be fluidly coupled to a water supply, such as a municipality water supply or well water supply, and the outlet 112 may be fluidly coupled to a faucet or another consumer side device (e.g., a water heater). That is, incoming water enters the water treatment device 100 through the water inlet 110, and treated water leaves the water treatment device 100 through the water outlet 112. For example, the incoming water may enter through the water inlet 110 into the cavity of the housing 102, and the treated water may leave the inner container 104 through the water outlet 112 after exposure to the water treatment material 106.

In some example embodiments, the cover 108 may be removably attached to the housing 102. The inner container 104 may be removable from the housing 102 by first removing the cover 108. For example, the inner container 104 may be replaced by another inner container when the water treatment material 106 in the inner container 104 becomes too depleted to effectively treat the incoming water. Alternatively, the water treatment material 106 in the inner container 104 may be replenished when the amount of the water treatment material 106 remaining in the inner container 104 is less than a threshold amount. In some alternative embodiments, the cover 108 may not be removable or may be integrally formed with the housing 102 and/or the inner container 104.

In some example embodiments, the magnetic sensor circuit 118 may determine whether the water treatment material 106 is depleted to a threshold amount based on the magnetic field strength of the magnetic object 114. For example, the magnetic sensor circuit 118 may provide one or more notifications when the water treatment material 106 becomes depleted to one or more threshold amounts. To illustrate, the magnetic object 114 may be a magnet or may include a magnet, and the magnetic sensor circuit 118 may include a magnetic field transducer that varies the voltage level of an electrical signal based on a change in a magnetic field that is sensed by the magnetic field transducer. For example, the magnetic sensor circuit 118 may include a Hall Effect sensor that varies the voltage level of an output electrical signal in response to changes in the magnetic field generated by the magnetic object 114.

As the water treatment material 106 becomes depleted over time from water treatment use, the amount of the water treatment material 106 in the inner container 104 is reduced, resulting in the magnetic object 114 moving physically closer to the magnetic sensor circuit 118. The magnetic field strength of the magnetic object 114 detected by the magnetic sensor circuit 118 also changes as the physical separation between the magnetic object 106 and the magnetic sensor circuit 118 is reduced. For example, the magnetic field strength of the magnetic object 114 sensed by the magnetic sensor circuit 118 may increase as the magnetic object 114 moves closer to the magnetic sensor circuit 118 as a result of the depletion of the water treatment material 106. As the magnetic object 114 moves closer to the magnetic sensor circuit 118 resulting in the increased magnetic field being sensed by the magnetic sensor circuit 118, the voltage level of an electrical signal resulting from or affected by the magnetic field of the magnetic object 114 may also change (e.g., increase).

In some example embodiments, the water treatment device 100 may not effectively treat the incoming water when the amount of the water treatment material 106 in the inner container 104 is depleted to below a threshold amount. The magnetic sensor circuit 118 may determine whether the water treatment material 106 is depleted to the threshold amount based on the magnetic field strength of the magnetic object 114. For example, the magnetic sensor circuit 118 may determine whether the water treatment material 106 is depleted to the threshold amount by comparing the voltage level of an electrical signal resulting from or affected by the magnetic field of the magnetic object 114 against a reference voltage level that corresponds to the threshold amount of the water treatment material 106 in the inner container 104. When the voltage of the electrical signal exceeds the reference voltage level, the magnetic sensor circuit 118 may provide a notification to indicate the condition. Alternatively, the magnetic sensor circuit 118 may provide a notification to indicate the condition when the voltage of the electrical signal is less than the reference voltage level.

For example, the magnetic sensor circuit 118 may transmit a message via a wireless signal (e.g., a Wi-Fi signal) as a notification that the water treatment material 106 is depleted to the threshold amount. The magnetic sensor circuit 118 may wirelessly transmit the notification messages to a mobile device that includes a related application, to a cloud server, etc. Alternatively or in addition, the magnetic sensor circuit 118 may transmit a message over a wired connection (e.g., an Ethernet cable, a Universal Serial Bus (USB) cable, etc.) as a notification that the water treatment material 106 is depleted to the threshold amount. The magnetic sensor circuit 118 may transmit the notification messages to a wired device that includes a related application, to a cloud server, etc. via a wired connection. For example, a local device may be connected to the water treatment device 100 directly via a cable or indirectly via a network device that is wired to the water treatment device 100. As another example, the magnetic sensor circuit 118 may transmit the notification messages to a wired device via a wired connection, and the wired device may wirelessly transmit the messages to a local mobile device, a remote device, etc.

In some example embodiments, the magnetic sensor circuit 118 may include circuitry to receive signals wirelessly or via a wired connection, for example, to establish communication with another device. For example, the magnetic sensor 118 may include a transceiver that can transmit and receive signals wirelessly or via a wired connection.

In some example embodiments, the magnetic sensor circuit 118 may continue to transmit a message periodically, wirelessly or via a wired connection, as long as the amount of the water treatment material 106 in the inner container 104 is at or less than the threshold amount. Alternatively, the magnetic sensor circuit 118 may transmit the message, wirelessly or via a wired connection, as a notification when the magnetic sensor circuit 118 first determines that the amount of the water treatment material 106 in the inner container 104 is at or less than the threshold amount and may not send subsequent notifications to indicate the condition.

In some example embodiments, instead of or in addition to the transmitted message, the magnetic sensor circuit 118 may provide a visual notification and/or an audio notification that the water treatment material 106 is depleted to the threshold amount. For example, the magnetic sensor circuit 118 may include a light source 122 (e.g., a light emitting diode (LED) light source) that, for example, emits a light, flashes a light, etc. to indicate that the water treatment material 106 is depleted to the threshold amount. The magnetic sensor circuit 118 may also include an audio device to provide the audio notification.

In some example embodiments, the magnetic sensor circuit 118 may provide the visual notification, for example, by having the light source 122 emit a light as long as the amount of the water treatment material 106 in the inner container 104 is at or less than the threshold amount. Alternatively, the magnetic sensor circuit 118 may provide the visual notification periodically as long as the amount of the water treatment material 106 in the inner container 104 is at or less than the threshold amount. The magnetic sensor circuit 118 may alternatively provide the visual notification for a duration of time when the magnetic sensor circuit 118 first determines the amount of the water treatment material 106 in the inner container 104 is at or less than the threshold amount and may not subsequently emit the light to indicate the condition. The magnetic sensor circuit 118 may also provide the audio notification in a manner similar as the visual notification.

In some example embodiments, the magnetic sensor circuit 118 may provide a notification to indicate that the water treatment material 106 in the inner container 104 has been depleted to an amount other than an amount that results in ineffective water treatment by the water treatment device 100. For example, the magnetic sensor circuit 118 may provide a notification to indicate that the water treatment material 106 in the inner container 104 has been depleted to a half of the full amount, to a quarter of the full amount, 10% of the full amount, etc.

In some example embodiments, the magnetic sensor circuit 118 may provide multiple notifications to indicate the depletion of the water treatment material 106 to more than one threshold amount. For example, the magnetic sensor circuit 118 may provide a first notification when the water treatment material 106 in the inner container 104 is depleted to a first threshold amount and may provide a second notification when the water treatment material 106 in the inner container 104 is depleted to a second threshold. For example, the magnetic sensor circuit 118 may compare the voltage level of an electrical signal resulting from or affected by the magnetic field of the magnetic object 114 against multiple reference voltage levels that correspond to different threshold amounts of the water treatment material 106. As described above, the magnetic sensor circuit 118 may provide the notifications by transmitting corresponding messages via wires, wirelessly and/or by providing corresponding visual and/or audio notifications at the water treatment device 100.

In some example embodiments, the magnetic sensor circuit 118 may provide periodic notifications to indicate the amount of the water treatment material 106 in the inner container 104. For example, the magnetic sensor circuit 118 may periodically determine the amount of the water treatment material 106 in the inner container 104 based on the magnetic field of the magnetic object 114, as described above.

In some example embodiments, the housing 102, the inner container 104, and the cover 108 may be made from plastic. For example, the housing 102, the inner container 104, and the cover 108 may be made from an opaque plastic material. The housing 102, the inner container 104, and the cover 108 may also be made from another suitable material, such as glass, as may be contemplated by those of ordinary skill in the art with the benefit of this disclosure.

By providing notifications related to the amount of water treatment material 106 remaining in the inner container 104, the water treatment device 100 enables timely replacement of the inner container 104 or the entire water treatment device 100, or the replenishment of the water treatment material 106. For example, the timely replacement of the inner container 104 and the entire water treatment device 100 may result in the avoidance of damage to devices (e.g., water heaters) that use the treated water from the water treatment device 100.

In some alternative embodiments, the different elements of the water treatment device 100, including the housing 102, the inner container 104, the cover 108, may have different shapes than shown in FIG. 1 without departing from the scope of this disclosure. In some example embodiments, the magnetic object 114, the magnetic sensor circuit 118, and the light source 122 may be at different locations than shown in FIG. 1 without departing from the scope of this disclosure. Although the magnetic object 114 is shown as positioned on the top surface 116 of the water treatment material 106, in some alternative embodiments, the magnetic object 114 may be positioned partially or entirely below the top surface 116 without departing from the scope of this disclosure. In some alternative embodiments, the magnetic sensor circuit 118 may provide other types of notifications in addition or instead of the types of notifications described above without departing from the scope of this disclosure.

Figure 2:
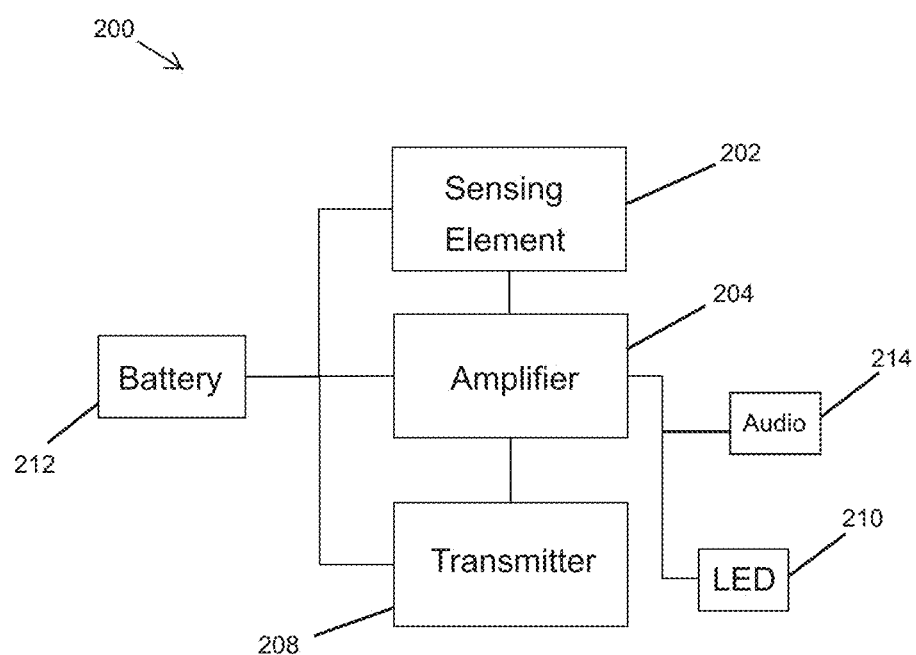
FIG. 2 illustrates a magnetic sensor circuit for detection of water treatment material depletion according to an example embodiment.

FIG. 2 illustrates a magnetic sensor 200 for detection of water treatment material depletion according to an example embodiment. The magnetic sensor 200 may correspond to the magnetic sensor circuit 118 shown in FIGS. 1 and 3-5. In some example embodiments, the magnetic sensor 200 includes a sensing element 202, an amplifier circuit 204, and a transmitter circuit 208. The magnetic sensor 200 may also include an LED light source 210.

In some example embodiments, the sensing element 202 may be a Hall Effect sensing element that provides an output electrical signal to the amplifier circuit 204. The voltage level of the output electrical signal may be a result of or may be affected by the magnetic field sensed by the sensing element 202. For example, the voltage level of the electrical signal provided to the amplifier circuit 204 by the sensing element 202 may increase as the strength of the magnetic field sensed by the sensing element 202 increases.

In some example embodiments, the amplifier circuit 204 may amplify the signal provided by the sensing element 202 and provide the amplified signal to the transmitter circuit 208. The amplifier circuit 204 may include one or more comparators to compare the amplified signal or the signal provided by the sensing element 202 against one or more reference voltage levels that correspond to one or more respective magnetic field strength levels sensed by the sensing element 202. For example, the strength of the magnetic field sensed by the sensing element 202 may correspond to a particular amount of the water treatment material 106 remaining in the water treatment device 100, as described above with respect to FIG. 1.

In some example embodiments, the transmitter circuit 208 may transmit a wireless signal (e.g., a Wi-Fi compliant signal) based on one or more output signals of the amplifier circuit 204 that indicate whether the amplified signal or the signal from the sensing element 202 exceeds a reference voltage level, matches a reference voltage level, or is less than a reference voltage level. For example, the reference voltage level may correspond to a particular threshold amount of the water treatment material 106 remaining in the inner container 104, as described with respect to FIG. 1. The amplifier circuit 204 may also compare the amplified signal or the signal from the sensing element 202 against multiple reference voltage levels that correspond to different amounts of the water treatment material 106 remaining in the inner container 104, as described with respect to FIG. 1. The transmitter circuit 208 may transmit, wirelessly or via a wired connection, different messages based on the outcome of the comparison against multiple reference voltage levels. In some example embodiments, the reference voltage levels may be hardwired or may be retrieved from a memory device or may be implemented in a different manner as may be contemplated by those of ordinary skill in the art with the benefit of this disclosure.

In some example embodiments, the transmitter circuit 208 may be capable of transmitting signals via a wired connection instead of or in addition to transmitting wireless signals. For example, the transmitter circuit 208 may transmit a message indicative of the amount of the water treatment material 106 remaining in the inner container 104 via a wired connection (e.g., an Ethernet cable such as CAT 5 cable, a USB cable, and/or another cable).

In some example embodiments, the magnetic sensor 200 may include circuitry to receive signals wirelessly or via a wired connection, for example, to establish communication with another device such a wired device or a wireless device. For example, the magnetic sensor 200 may include a transceiver. To illustrate, the transmitter circuit 208 may be a transceiver that can transmit and receive wired and/or wireless signals.

In some example embodiments, the amplifier circuit 204 may also provide power to the LED light source 210 to provide a visual notification (e.g., turn on the LED light source) when the amplified signal or the signal from the sensing element 202 exceeds one or more reference voltage levels, matches a reference voltage level, or is less than one or more reference voltage levels. The amplifier circuit 204 may selectively provide power to different LEDs of the LED light source 210 depending on the comparison of the voltage level of the amplified signal or the signal from the sensing element 202 against different reference voltage levels that correspond to different amounts of the water treatment material 106 remaining in the inner container 104, as described above. For example, the amplifier circuit 204 may provide power to one LED of the light source 210 to indicate a first amount of the water treatment material 106 remains in the inner container 104 and may provide power to another LED of the light source 210 to indicate a second amount remains in the inner container 104.

In some example embodiments, the magnetic sensor 200 may provide audio notification using an audio device 214 in a similar manner as described with respect to the LED light source 210. For example, the audio device 214 may be a buzzer or a speaker that can produce a sound in response to an electrical signal provided by the amplifier circuit 204.

In some example embodiments, a battery 212 may provide power to the sensing element 202, the amplifier circuit 204, and the transmitter circuit 208. Alternatively or in addition, a power converter that converts power from an AC source may provide power to one or more of the sensing element 202, the amplifier circuit 204, and the transmitter circuit 208.

In some alternative embodiments, two or more of the components of the magnetic sensor 200 may be integrated into a single component without departing from the scope of this disclosure. In some example embodiments, the transmitter circuit 208, the light source 210, the battery 212, and/or the audio device 214 may be external to the water treatment device 200 without departing from the scope of this disclosure.

Figure 3:
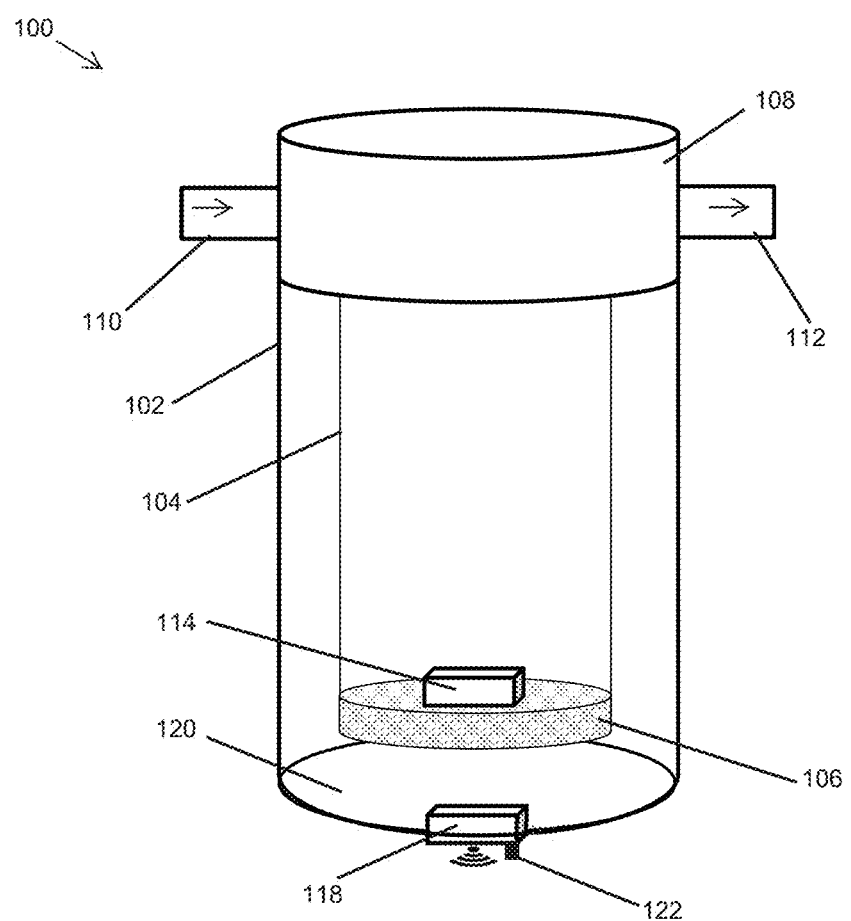
FIG. 3 illustrates the water treatment device of FIG. 1 with a depleted amount of water treatment material according to an example embodiment.

FIG. 3 illustrates the water treatment device 100 of FIG. 1 with a depleted amount of water treatment material according to an example embodiment. As illustrated in FIG. 3, the water treatment material 106 has been depleted to a smaller amount as compared to the amount of the water treatment material 106 shown in FIG. 1. The strength of the magnetic field of the magnetic object 114 sensed by the magnetic sensor circuit 118 when the water treatment material 106 is depleted to the amount shown in FIG. 3 may be significantly more than the strength of the magnetic field sensed by the magnetic sensor circuit 118 when the water treatment device 100 contained much more of the water treatment material 106 as shown in FIG. 1.

For example, the magnetic sensor circuit 118 may transmit a message wirelessly or via a wired connection or provide local visual and/or audio notification if the amount of the water treatment material 106 shown in FIG. 3 is a threshold amount associated with a notification. A consumer may replace the water treatment device 100 or the inner container 104 or replenish the water treatment material 106 as a result of the notification provided by the water treatment device 100.

Figure 4:
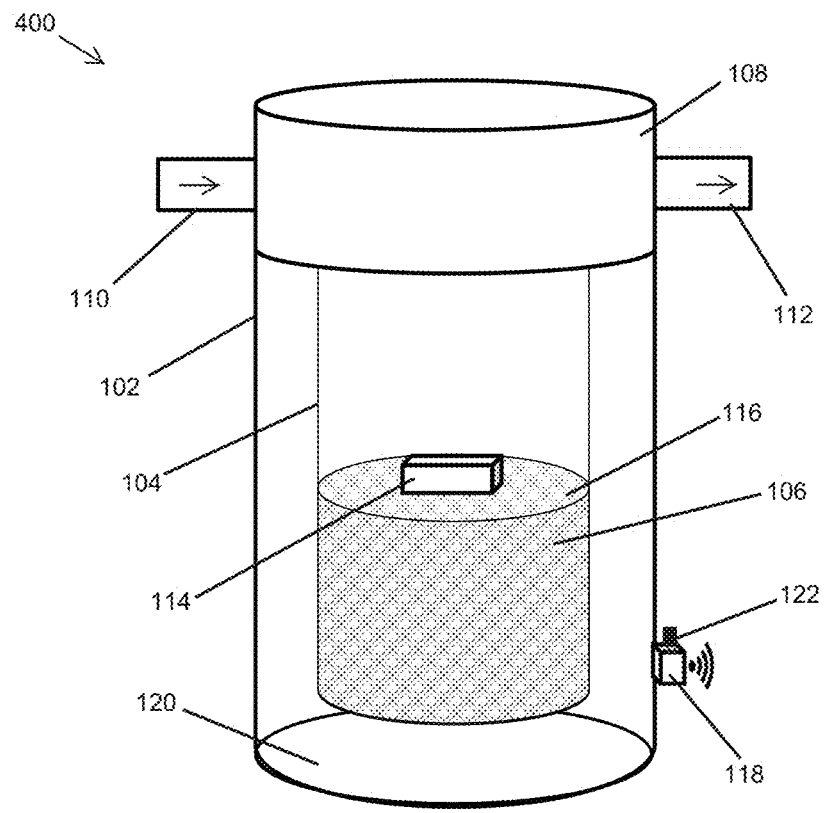
FIG. 4 illustrates a water treatment device with magnet-based detection of water treatment material depletion according to another example embodiment.

FIG. 4 illustrates a water treatment device 400 with magnet-based detection of water treatment material depletion according to another example embodiment. The water treatment device 100 is similar to and operates in a similar manner to the water treatment device 400, with the primary difference being the location of the magnetic sensor circuit 118. In contrast to the water treatment device 100, the magnetic sensor circuit 118 of the water treatment device 400 is located on a side (i.e., lateral wall/surface) of the housing 102 instead of at the bottom wall of the housing 102. In both water treatment devices 100 and 400, the magnetic sensor circuit 118 may be located on the outside of the housing 102.

As the water treatment material 106 becomes depleted over time from water treatment use, the magnetic object 114 moves closer to the magnetic sensor circuit 118. The magnetic sensor circuit 118 may provide one or more notifications in the same manner as described above with respect to the water treatment device 100 as the magnetic object 114 moves closer to the magnetic sensor circuit 118. For example, the magnetic sensor circuit 118 may transmit a message to a mobile device over a local area network or to a cloud server over the internet.

Figure 5:
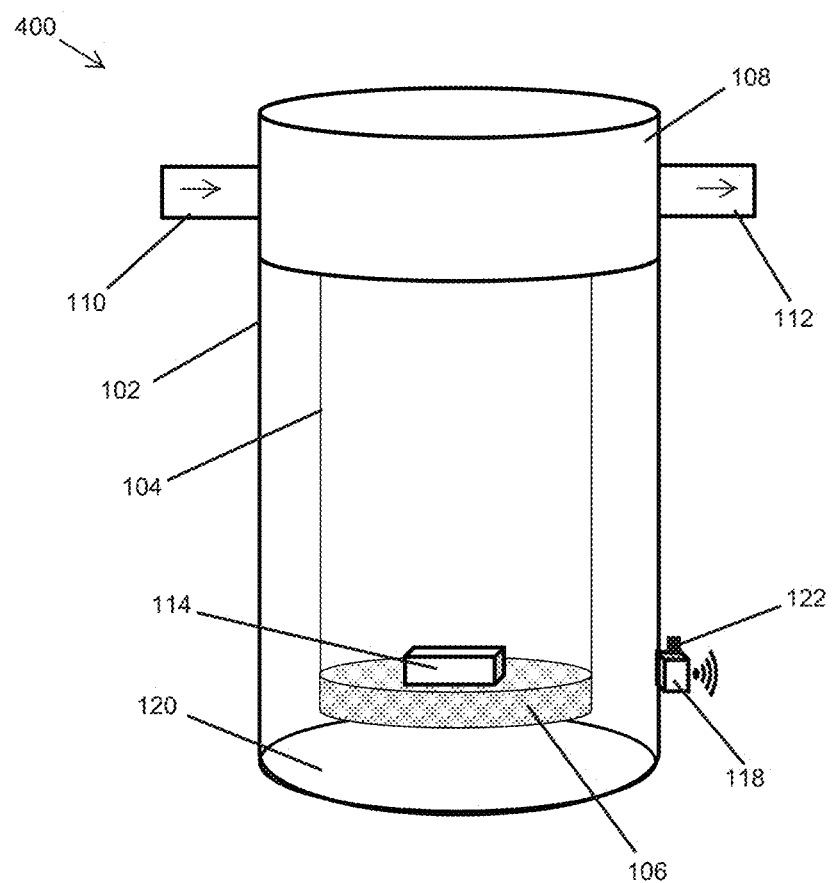
FIG. 5 illustrates the water treatment device of FIG. 4 with depleted water treatment material according to an example embodiment.

FIG. 5 illustrates the water treatment device 400 of FIG. 4 with a depleted amount of the water treatment material 106 according to an example embodiment. As illustrated in FIG. 5, the water treatment material 106 has been depleted to a small amount compared to the amount of the water treatment material 106 shown in FIG. 4. The strength of the magnetic field of the magnetic object 114 sensed by the magnetic sensor circuit 118 when the water treatment material 106 is depleted to the amount shown in FIG. 5 may be significantly more than the strength of the magnetic field sensed by the magnetic sensor circuit 118 when the water treatment device 100 contained much more of the water treatment material 106 as shown in FIG. 4.

For example, the magnetic sensor circuit 118 may transmit a message wirelessly or via a wired connection or provide local visual and/or audio notification if the amount of the water treatment material 106 shown in FIG. 5 is a threshold amount associated with a notification. A consumer may replace the water treatment device 400 or the inner container 104 or replenish the water treatment material 106 as a result of the notification provided by the water treatment device 400.

Figure 6:
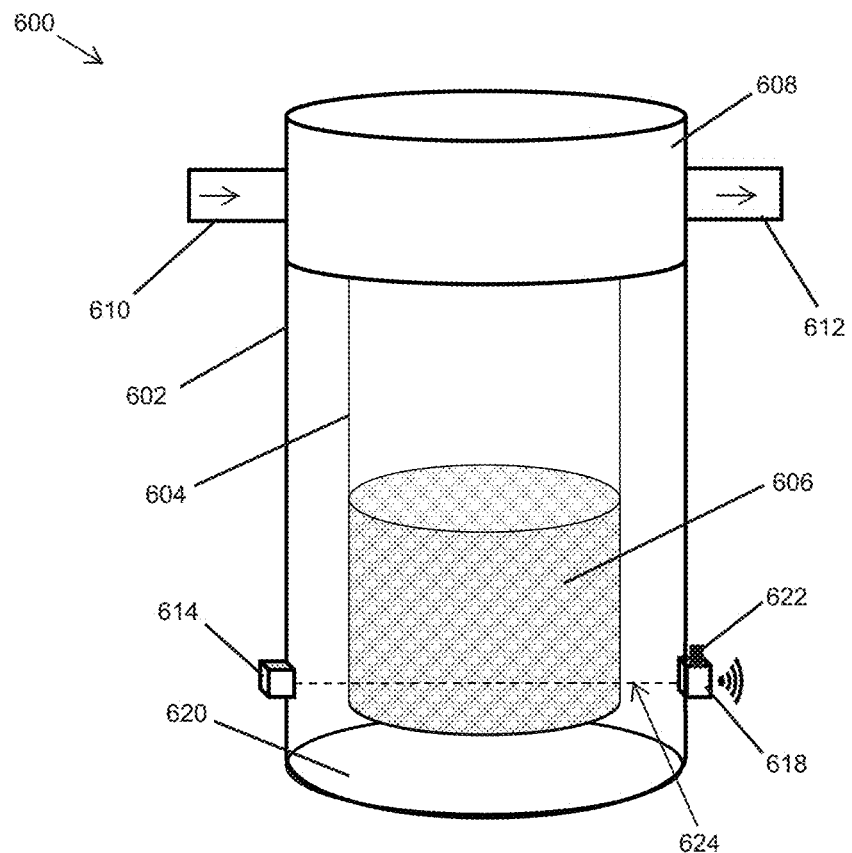
FIG. 6 illustrates a water treatment device with light-based detection of water treatment material depletion according to an example embodiment.

FIG. 6 illustrates a water treatment device 600 with light based detection of water treatment material depletion according to an example embodiment. In some example embodiments, the water treatment device 600 may be a water filtration device. As illustrated in FIG. 6, the water treatment device 600 may include a housing 602 and an inner container 604 that is located inside the housing 602. The inner container 604 may contain a water treatment material 606 that is used for treating incoming water. In some example embodiments, the housing 602, the inner container 604, and the water treatment material 606 correspond to the housing 102, the inner container 104, and the water treatment material 106, respectively, described above.

In some example embodiments, the water treatment device 600 may also include a cover 608. The cover 608 may include a water inlet 610 and a water outlet 612. For example, the cover 608 may correspond to the cover 110 described above with respect to the water treatment device 100.

In some example embodiments, the water treatment device 600 includes a light source 614 and a photo sensor circuit 618 that are positioned on the outside of the housing 602 across from each other. The light source 614 and the photo sensor circuit 618 may be located diametrically across from each other. Alternatively, the light source 614 and the photo sensor circuit 618 may be located across from each other without being diametrically across each other. The light source 614 and the photo sensor circuit 618 may be attached to the side wall 120 of the housing 102 by an adhesive or other means as may be contemplated by those of ordinary skill in the art with the benefit of this disclosure.

In some example embodiments, the light source 614 may be positioned to emit a light in a direction of the photo sensor circuit 618, and the photo sensor circuit 618 may be positioned to receive the light from the light source 614 when the path between the two is not blocked by the water treatment material 606. For example, the light source 614 may emit a visible light, an infrared light, or both. The light source 614 may emit the light periodically or continuously.

In some example embodiments, the photo sensor circuit 618 may determine whether the water treatment material 606 is depleted to a threshold amount based on whether the photo sensor circuit 618 receives a light through the housing 602. For example, when the amount of the water treatment material 606 in the inner container 604 is above a threshold amount, the water treatment material 606 may block the path of the light emitted by the light source 614 from reaching the photo sensor circuit 618 through the housing 602 and the inner container 604. When the amount of the water treatment material 606 in the inner container 604 is depleted to or below the threshold amount, the water treatment material 606 may no longer block the path of the light emitted by the light source 614 from reaching the photo sensor circuit 618 through the housing 602 and the inner container 604. Upon detecting the light from the light source 614, the photo sensor circuit 618 may provide a notification indicating that the water treatment material 606 is depleted to or below the threshold amount.

The photo sensor circuit 618 may transmit a message wirelessly or via a wired connection and/or provide a local visual and/or audio notification in a similar manner as described with respect to the magnetic sensor circuit 118 shown in FIG. 1 when the water treatment material 606 becomes depleted to the threshold amount. For example, the light sensor circuit 618 may include a transmitter that transmits signals wirelessly (e.g., Wi-Fi signals) or via a wired connection (e.g., Ethernet cable, USB cable, etc.) to a mobile device, to a local or remote wired device, or to a cloud server. The photo sensor circuit 618 may include a light source 622 (e.g., an LED light source) that, for example, emits a light as a notification of the depletion of the water treatment material 606 to the threshold amount. The photo sensor circuit 618 may include an audio device (e.g., a buzzer) to provide the audio notification.

In some example embodiments, the photo sensor circuit 618 may continue to transmit a message periodically as long as the amount of the water treatment material 606 in the inner container 604 is at or less than the threshold amount. Alternatively, the photo sensor circuit 618 may transmit the message as a notification when the photo sensor circuit 618 first determines that the amount of the water treatment material 606 in the inner container 604 is at or less than the threshold amount and may not send subsequent notifications to indicate the condition.

In some example embodiments, the photo sensor circuit 618 may provide the visual notification, for example, by having the light source 622 emit a light as long as the amount of the water treatment material 606 in the inner container 604 is at or less than the threshold amount. Alternatively, the photo sensor circuit 618 may provide the visual notification periodically as long as the amount of the water treatment material 606 in the inner container 604 is at or less than the threshold amount. The photo sensor circuit 618 may alternatively provide the visual notification for a duration of time when the photo sensor circuit 618 first determines the amount of the water treatment material 606 in the inner container 604 is at or less than the threshold amount and may not subsequently emit the light to indicate the condition. The photo sensor circuit 618 may also provide the audio notification in a manner similar as the visual notification.

In some example embodiments, the photo sensor circuit 618 may provide a notification to indicate that the water treatment material 606 in the inner container 604 has been depleted to an amount that is ineffective for water treatment by the water treatment device 600. Alternatively, the photo sensor circuit 618 may provide a notification to indicate that the water treatment material 606 in the inner container 604 has been depleted to an amount other than an amount that corresponds to ineffective water treatment by the water treatment device 600. For example, the photo sensor circuit

618 may provide a notification to indicate that the water treatment material 606 in the inner container 604 has been depleted to a half of the full amount, to a quarter of the full amount, 10% of the full amount, etc.

In some example embodiments, the photo sensor circuit 618 may provide periodic notifications indicating whether the water treatment material 606 has been depleted to a threshold amount. For example, the photo sensor circuit 618 may transmit messages periodically, wirelessly or via a wired connection, indicating whether the light from the light source 614 is detected by the photo sensor circuit 618.

In some example embodiments, the housing 602, the inner container 604, and the cover 608 may be made from plastic, glass, or another material that allows light to pass therethrough.

By providing notifications related to the amount of water treatment material 606 remaining in the inner container 604, the water treatment device 600 enables timely replacement of the inner container 604 or the entire water treatment device 600, or the replenishment of the water treatment material 606. For example, the timely replacement of the inner container 604 and the entire water treatment device 600 may result in the avoidance of damage to devices (e.g., water heaters) that use the treated water from the water treatment device 600.

In some alternative embodiments, the different elements of the water treatment device 600, including the housing 602, the inner container 604, the cover 608, may have different shapes than shown in FIG. 6 without departing from the scope of this disclosure. In some example embodiments, the light source 614, the photo sensor circuit 618, and the light source 622 may be at different locations than shown in FIG. 6 without departing from the scope of this disclosure. In some alternative embodiments, the photo sensor circuit 618 may provide other types of notifications in addition or instead of the types of notifications described above without departing from the scope of this disclosure.

Figure 7:
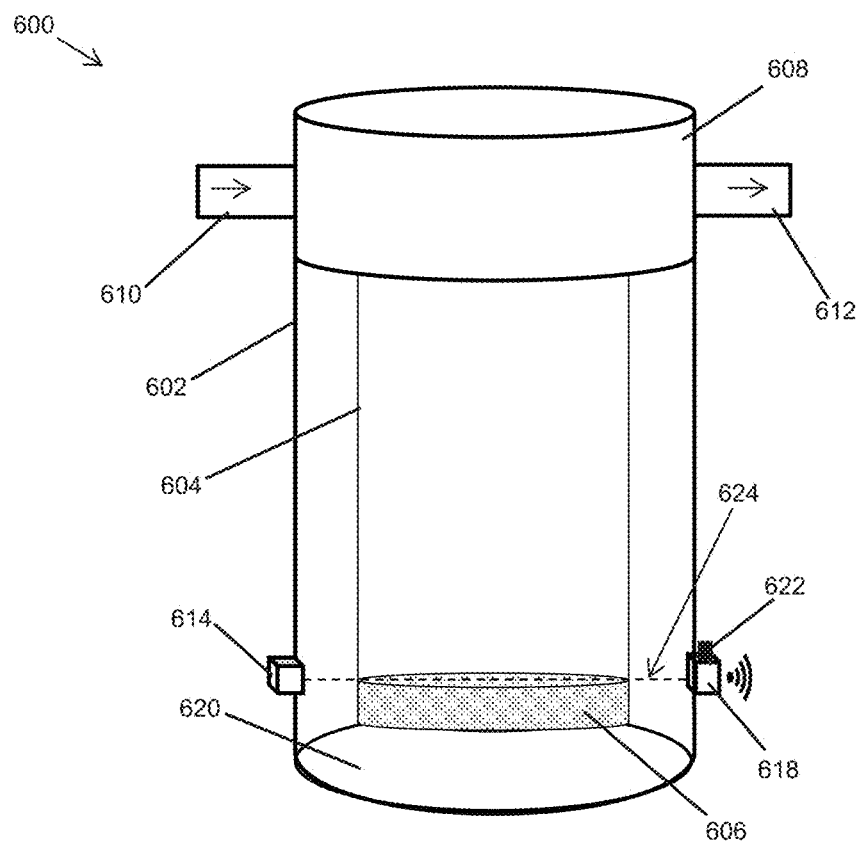
FIG. 7 illustrates the water treatment device of FIG. 6 with depleted water treatment material according to an example embodiment.

FIG. 7 illustrates the water treatment device 600 of FIG. 6 with a depleted amount of the water treatment material 606 according to an example embodiment. As illustrated in FIG. 7, the water treatment material 606 has been depleted to a smaller amount as compared to the amount of the water treatment material 606 shown in FIG. 6. Because a path 624 is no longer blocked by the water treatment material 606, the photo sensor circuit 618 may receive the light emitted by the light source 614 and provide notification as described above. For example, the magnetic sensor circuit 118 may transmit, wirelessly or via a wired connection, a message or provide local visual and/or audio notification indicating that the amount of the water treatment material 606 is at or below a threshold amount. A consumer may replace the water treatment device 600 or the inner container 604 or replenish the water treatment material 606 as a result of such notification provided by the water treatment device 600.

Figure 8:
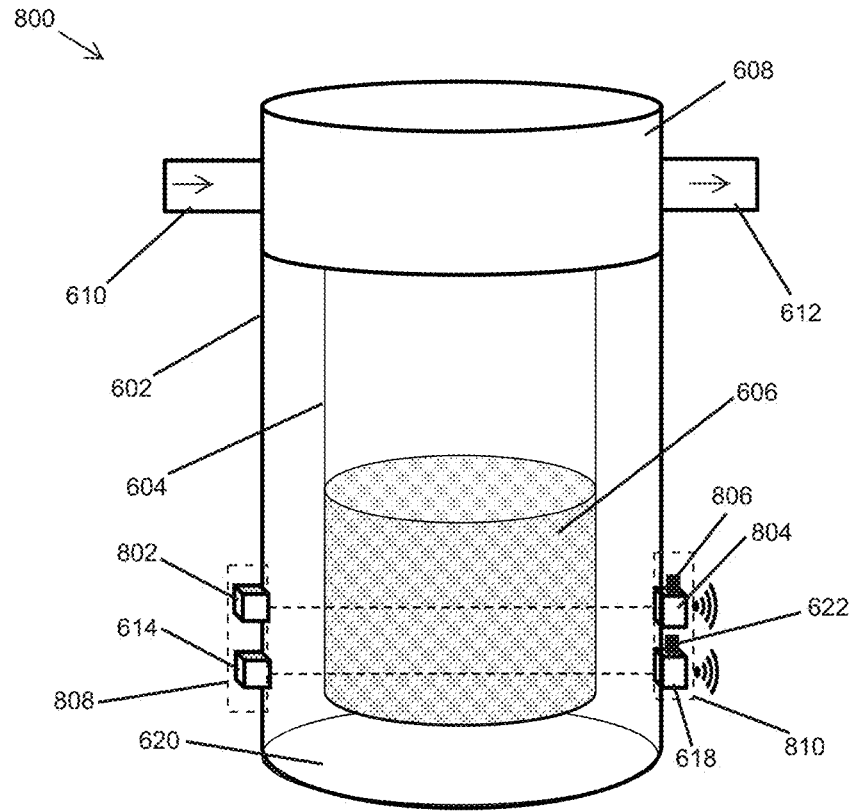
FIG. 8 illustrates a water treatment device with light-based detection of water treatment material depletion according to another example embodiment.

FIG. 8 illustrates a water treatment device 800 with light based detection of water treatment material depletion according to another example embodiment. In some example embodiments, the water treatment device 800 may detect multiple threshold amounts of the water treatment material 606 and provide multiple corresponding notifications to indicate the depletion of the water treatment material 606 to more than one threshold amount. In some example embodiments, the water treatment device 800 is substantially similar to the water treatment device 600 of FIG. 1. In contrast to the water treatment device 600, the water treatment device 800 includes a second light source 802, and a second light sensor circuit 804. The light source 802 and the light sensor circuit 804 may be positioned on the outside of the housing 602 across from each other such that a light emitted by the light source 802 can be received by the light sensor circuit 804 when the water treatment material 606 is depleted to a particular threshold amount that is more than the threshold amount detected using the light source 614 and the photo sensor circuit 618.

In some example embodiments, the light sensor circuit 804 may provide a notification when the water treatment material 606 is depleted to a particular threshold amount that allows the light emitted by the light source 802 to reach the light sensor circuit 804. For example, the light source 802 may emit a visible light, an infrared light, or both. The light sensor circuit 804 may transmit a message wirelessly or via a wired connection or provide local visual (e.g., emitting a light by a light source 806) and/or audio notification indicating that the amount of the water treatment material 606 is at or below the particular threshold amount.

Although two pairs of light source and light sensor circuit are shown in FIG. 8, in alternative embodiments, the water treatment device 800 may include more than two pairs. In some example embodiments, the light source 802 and the light source 614 may be in a single device 808, and the light sensor circuit 804 and the photo sensor circuit 618 may be in a single device 810 without departing from the scope of this disclosure.

Figure 9:
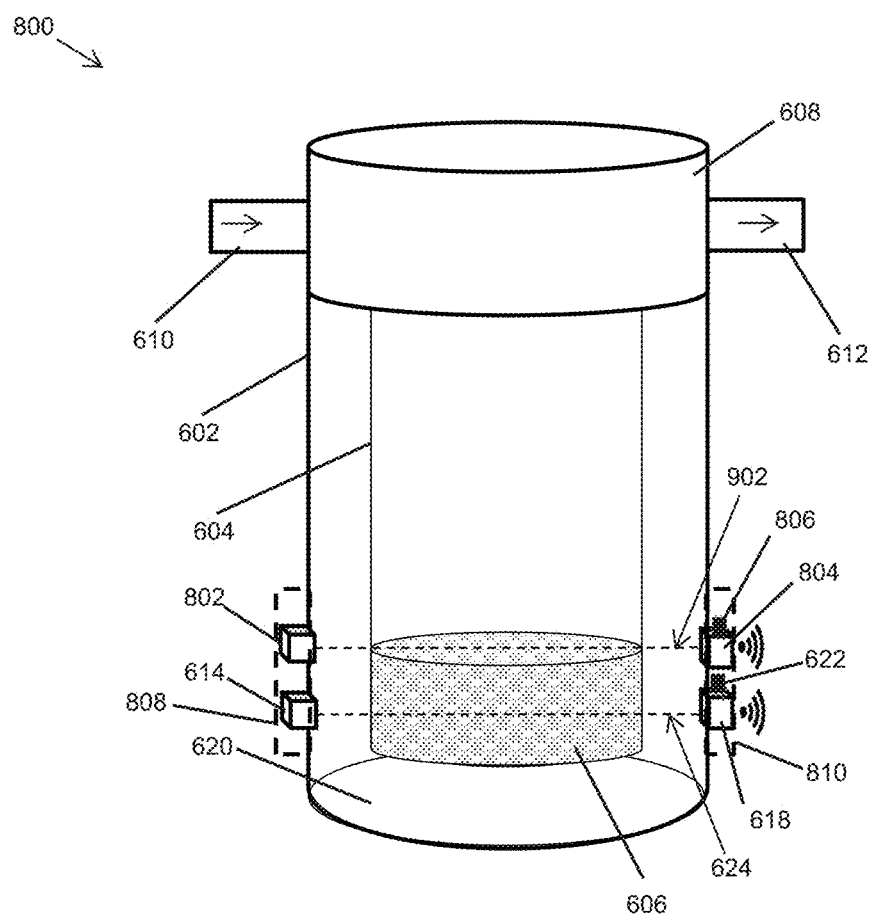
FIG. 9 illustrates the water treatment device of FIG. 8 with depleted water treatment material according to an example embodiment.

FIG. 9 illustrates the water treatment device 800 of FIG. 8 with depleted amount of the water treatment material 606 according to an example embodiment. As illustrated in FIG. 9, the water treatment material 606 has been depleted to an amount that is less than the amount of the water treatment material 606 shown in FIG. 8. Because a path 902 is no longer blocked by the water treatment material 606, the light sensor circuit 804 may receive the light emitted by the light source 802 and provide notification as described above. For example, the light sensor circuit 804 may transmit a message or provide local visual and/or audio notification indicating that the amount of the water treatment material 606 is at or below a first threshold amount.

When the water treatment material 606 becomes depleted to a second threshold amount such that the path 624 is no longer blocked by the water treatment material 606, the photo sensor circuit 618 may receive the light emitted by the light source 614 and provide one or more notifications as described above. A consumer may replace the water treatment device 600 or the inner container 604 or replenish the water treatment material 606 as a result of such notification provided by the water treatment device 600.

Figure 10:
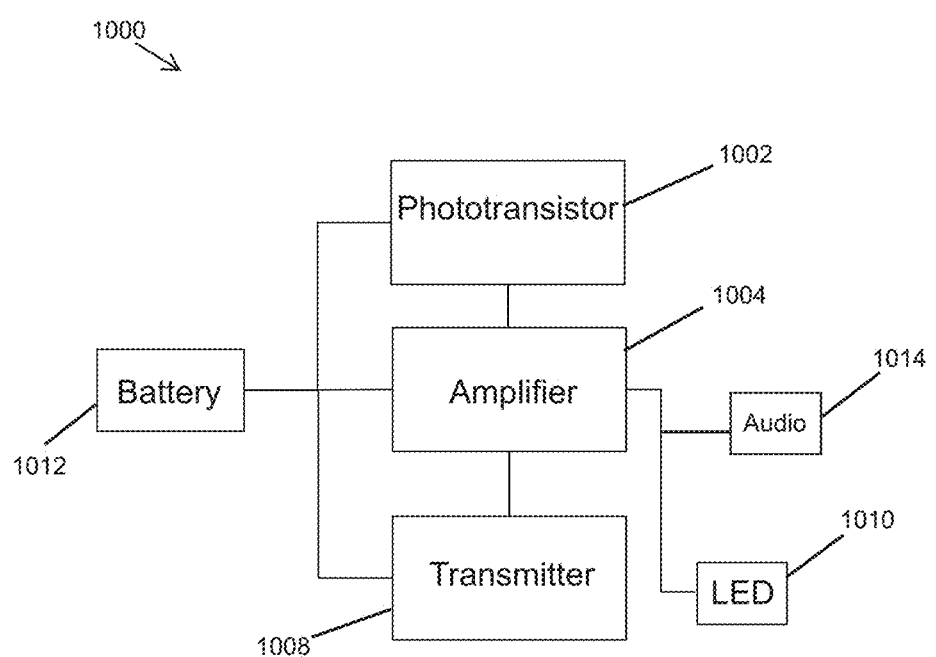
FIG. 10 illustrates a light sensor for detection of water treatment material depletion according to an example embodiment.

FIG. 10 illustrates a light sensor circuit 1000 for detection of water treatment material depletion according to an example embodiment. The light sensor circuit 1000 may correspond to the light sensor circuits 618, 804 shown in FIGS. 6-9. In some example embodiments, the light sensor circuit 1000 includes a photo sensor 1002, an amplifier circuit 1004, and a transmitter circuit 1008. The light sensor circuit 1000 may also include an LED light source 1010.

In some example embodiments, the photo sensor 1002 converts a received light into an output electrical signal. For example, the electrical signal from the photo sensor 1002 may be provided to the amplifier circuit 1004. The voltage level of the output electrical signal may be a result of or may be affected by the amount of light received by the photo sensor 1002. For example, the voltage level of the electrical signal provided to the amplifier circuit 1004 by the photo sensor 1002 may be relatively higher or lower when the photo sensor 1002 receives a light from a source, such as the light source 614, 802, compared to when the path of a light is blocked by a material, such as the water treatment material 606.

In some example embodiments, the amplifier circuit 1004 may amplify the signal provided by the photo sensor 1002 and provide the amplified signal to the transmitter circuit 1008. The amplifier circuit 1004 may include one or more comparators and/or other circuitry to compare the amplified signal or the signal provided by the photo sensor 1002 against a reference voltage level.

In some example embodiments, the transmitter circuit 1008 may transmit a signal wirelessly (e.g., a Wi-Fi compliant signal) or via a wired connection based on one or more output signals of the amplifier circuit 1004 that indicate whether the amplified signal or the signal from the photo sensor 1002 exceeds a reference voltage level, matches a reference voltage level, or less than a reference voltage level. In some example embodiments, the reference voltage levels may be hardwired or may be retrieved from a memory device or may be implemented in a different manner as may be contemplated by those of ordinary skill in the art with the benefit of this disclosure.

In some example embodiments, the transmitter circuit 1008 may transmit a message indicative of the amount of the water treatment material 106 remaining in the inner container 104 via a wired connection (e.g., an Ethernet cable such as CAT 5 cable, a USB cable, and/or another cable). For example, the light sensor circuit 1000 may include circuitry to receive signals wirelessly or via a wired connection, for example, to establish communication with another device such a wired device or a wireless device. For example, the light sensor circuit 1000 may include a transceiver. To illustrate, the transmitter circuit 1008 may be a transceiver that can transmit and receive wired and/or wireless signals.

In some example embodiments, the amplifier circuit 1004 may also provide power to the LED light source 1010 to provide a visual notification (e.g., turn on the LED light source) when the amplified signal or the signal from the photo sensor 1002 exceeds a reference voltage level, matches a reference voltage level, or less than a reference voltage level.

In some example embodiments, the light sensor circuit 1000 may provide audio notification using an audio device 1014 in a similar manner as described with respect to the LED light source 1010. For example, the audio device 1014 may be a buzzer or a speaker that can produce a sound in response to an electrical signal provided by the amplifier circuit 1004.

In some example embodiments, a battery 1012 may provide power to the photo sensor 1002, the amplifier circuit 1004, and the transmitter circuit 1008. Alternatively or in addition, a power converter that converts power from an AC source may provide power to one or more of the photo sensor 1002, the amplifier circuit 1004, and the transmitter circuit 1008.

In some alternative embodiments, two or more components of the light sensor circuit 1000 may be integrated into a single component without departing from the scope of this disclosure. In some example embodiments, the transmitter circuit 1008, the light source 1010, the battery 1012, and/or the audio device 1014 may be external to the light sensor circuit 1000 without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

What is claimed is:

1. A water treatment device comprising:
   a water treatment material contained within a housing of the water treatment device, wherein incoming water is exposed to the water treatment material to produce treated water;
   a light source that emits a light; and
   a photo sensor circuit that is located to receive the light when the water treatment material is depleted to a threshold amount, wherein the light source and the photo sensor circuit are located outside of the housing diametrically opposite each other, wherein the incoming water enters into a cavity of the housing through a water inlet, wherein the treated water exits the housing through a water outlet, wherein the water treatment material blocks the light from reaching the photo sensor circuit until the water treatment material is depleted to the threshold amount, and wherein, in response to receiving the light, the photo sensor circuit provides a notification indicating the water treatment material is depleted to the threshold amount.

2. The water treatment device of claim 1, wherein the photo sensor circuit provides the notification by generating a visual or audio indicator.

3. The water treatment device of claim 1, wherein the photo sensor circuit provides the notification by transmitting a message wirelessly or via a wired connection.

4. The water treatment device of claim 1, further comprising a second LED light source that emits a second light and a second photo sensor circuit, wherein the water treatment material blocks the second light from reaching the photo sensor circuit until the water treatment material is depleted to a second threshold amount, wherein the second photo sensor circuit provides a second notification in response to receiving the second light.

5. The water treatment device of claim 1, further comprising an inner container located inside the housing, wherein the water treatment material is contained in the inner container.

6. The water treatment device of claim 1, wherein the housing is made from a plastic material.

7. The water treatment device of claim 1, wherein the photo sensor circuit is powered by a battery.

8. The water treatment device of claim 1, wherein the light emitted by the light source is a visible light.

9. The water treatment device of claim 1, wherein the light emitted by the light source is an infrared light.

* * * * *